United States Patent [19]

Leonard

[11] Patent Number: 4,973,030

[45] Date of Patent: Nov. 27, 1990

[54] SPRING ASSEMBLY

[75] Inventor: George H. Leonard, Darien, Conn.

[73] Assignee: Stern & Leonard Associates, Wilton, Conn.

[21] Appl. No.: 403,657

[22] Filed: Sep. 6, 1989

[51] Int. Cl.⁵ .............................................. F16F 1/12
[52] U.S. Cl. ...................................... 267/71; 267/174
[58] Field of Search ..................... 267/70, 71, 72, 169, 267/170, 174, 176, 182

[56] References Cited

U.S. PATENT DOCUMENTS

| | | | |
|---|---|---|---|
| 1,900,289 | 3/1933 | Kelly et al. | 267/176 |
| 1,960,709 | 5/1934 | Olenick | 267/174 X |
| 2,368,775 | 2/1945 | Perret | 267/174 X |
| 3,503,601 | 3/1970 | Wells | 267/169 |
| 4,385,754 | 5/1983 | Waite | 267/71 |

*Primary Examiner*—Duane A. Reger
*Attorney, Agent, or Firm*—Perman & Green

[57] ABSTRACT

A compression spring assembly which includes a compression spring and a pair of identical but oppositely disposed guide members. The guide members have cooperating transversely extending keyways which are aligned to receive a key to maintain the assembly in a retracted, inoperative, condition. When placed in its operative environment, the spring assembly is suitably oriented and the key is removed from the keyway, thereby permitting the spring to expand to the greatest length possible under the circumstances. The spring assembly is capable of a broad range of movement along the axis of the spring. Subsequently, the spring assembly can be removed and returned to its retracted, inoperative condition by reversing the procedure just described.

28 Claims, 3 Drawing Sheets

SPRING ASSEMBLY

BACKGROUND OF THE INVENTION a. Related Application

Reference is hereby made to my copending application filed on the same date as the present application, Ser. No. 403,571, entitled "Self-Positioning Belt Tensioner"

b. Field of the Invention

The present invention relates generally to spring assemblies and, more particularly, to a captured spring assembly and its components which can be readily inserted and attached with accuracy to adjoining components and subsequently removed with minimal effort. It also assures support of the spring in operation over a wide range of lengths.

c. Description of the Prior Art

Any mechanical assembly utilizing a spring, such as a compression spring, which requires that it be somewhat compressed to enable its insertion and attachment to adjoining components calls for substantial expertise on the part of the installer. Springs subjected to compression have a well known tendency to buckle, that is, their central regions intermediate their ends tend to move laterally away from a position coaxial with their longitudinal axes. When this happens, the spring fails and the insertion step must be attempted again. However, while the spring may fail during installation, it may also fail during use if it has an aspect ratio, free length to mean coil diameter, greater than about 2.7 and is not laterally restrained, assuming hinged ends. See *Kent's Mechanical Engineers, Handbook*, Colin Carmichael, Editor, John Wiley & Sons, Inc., New York, 1965.

SUMMARY OF THE INVENTION

The invention herein relates to a spring assembly and its components which particularly aid in the installation and support of the spring. In one embodiment of the invention, that of a compression spring, the foregoing problems of installation and operation are solved. By so doing, it enables use of a spring having an aspect ratio which is far in excess of 2.7 thereby permitting narrow constructions which are often sought. To this end, a compression spring assembly is disclosed which can be readily assembled, then held for an indeterminate time in an inoperative condition. At installation time, the inoperative spring assembly is properly positioned and a key member withdrawn allowing it to expand into engagement with the components intended to be biased apart. For removal of the spring assembly from those components, it is compressed to a length at which the key member can be re-inserted, thereby returning the spring assembly to the inoperative condition.

Each of a pair of identical but oppositely disposed guide members has a head and a pair of elongated legs extending from a shoulder defining one surface of the head. The legs of one of the guide members are interdigitably, slidably, matingly engaged with the legs of the other of the guide members. When fully engaged, the tip ends of one of the guide members are proximate to the head of the other of the guide members. A compression spring is slidably engageably received on the elongated legs of both guide members such that its opposite ends bear against the mutually facing shoulders of the opposed heads. When the heads are moved toward one another so that the tip ends of one of the guide members engages the shoulder of the other of the guide members, and vice versa, transverse keyways formed, respectively, in the head of one of the guide members and proximate to the tip ends of the other of the guide members are aligned to receive therethrough a key member which serves to retain the entire assembly in a retracted, inoperative, condition. Extreme opposed portions of the heads are bearing surfaces. When it is desired to install the spring assembly into an operating environment, the bearing surface of one of the heads is engaged with its intended mating component and the spring assembly is moved to its general intended orientation. Thereupon, the key member is withdrawn from the keyway. Under the bias of the compression spring, the spring assembly is caused to expand until the other of the heads also becomes engaged with its intended mating component. For this operation, the installer may guide the free head into engagement with its intended mating component.

The compression spring assembly of the invention is able to accommodate a wide range of lengths and still remain effective to apply a bias on one or both of its mating components. The actual range of lengths which it can accommodate depends upon the dimensions of its component parts.

Thus, the invention is of extremely simple design, utilizes known materials, can be inexpensively manufactured, easily installed, and just as easily removed from an installation.

When, for any reason, the compression spring assembly is to be removed from its installed state, it is merely compressed to its retracted or collapsed condition at which the transverse keyways are again aligned enabling the associated key member once again to be inserted to maintain the assembly in that condition for so long as is desirable. In its retracted condition, the spring assembly of the invention remains ready for immediate use at any future time.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

DETAILED DESCRIPTION OF THE PREFERRED EMBODIMENT

Although this invention is described herein by way of a compression spring embodiment used for supporting a drive belt, the invention is not to be so limited. The inventive concept and features can be used with any type of spring to which it can be adapted and in any environment in which the spring may be useful.

Figure 1:
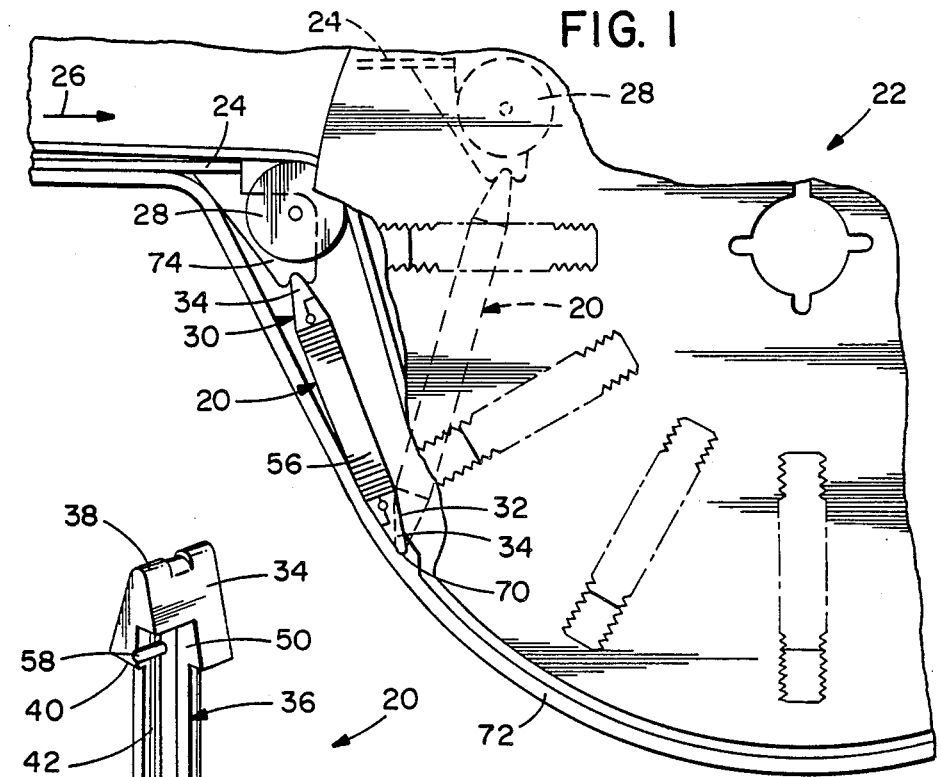
FIG. 1 is a detail front elevation view of an installation incorporating a compression spring assembly embodying the invention.

Turn now to the drawings and, initially, to FIG. 1 which illustrates a compression spring assembly 20 embodying the invention incorporated into a typical installation 22. In the depicted installation, a drive belt 24 is advanced in the direction of an arrow 26 and passes around and in engagement with a pulley 28 as it continues on its way.

For purposes of the installation 22, it is desired to maintain tension on the drive belt 24 at all times and, therefore, it is necessary to take up any slack which occurs. Thus, as the pulley 28 moves between one extreme position illustrated by solid lines in FIG. 1 to another extreme position illustrated by dotted lines, the spring assembly 20 is effective to accommodate those changes and maintain substantially constant tension on the drive belt 24.

Figure 4:
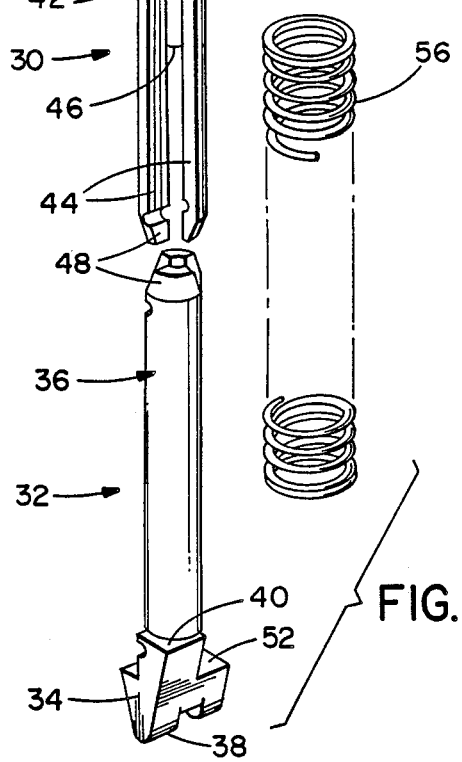
FIG. 4 is an exploded view, in perspective, of the compression spring assembly of the invention.
Figures 2, 3:
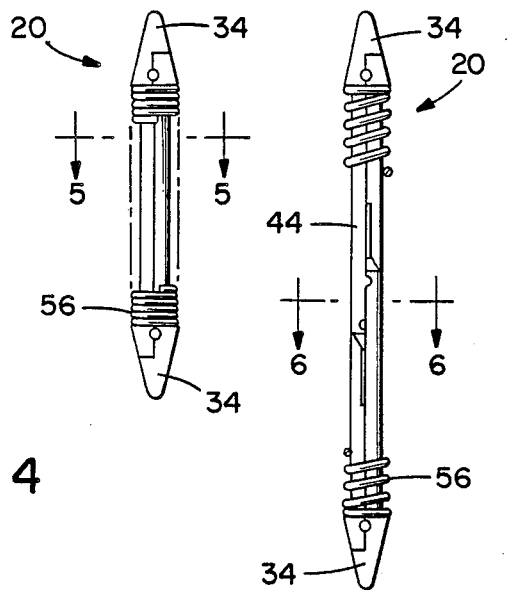
FIGS. 2 and 3 are side elevation views illustrating, respectively, the retracted condition and the expanded condition of the compression spring assembly of the invention.
Figure 10:
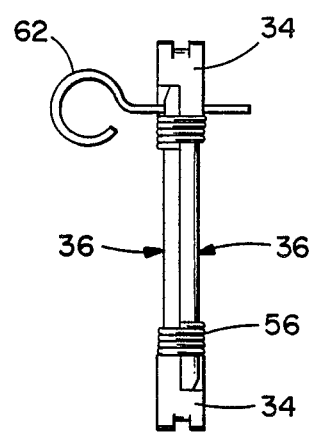
FIG. 10 is a front elevation view of the spring assembly in its retracted condition.

For a more specific description of the spring assembly, turn now to FIGS. 2, 3, and 4. The assembly is comprised of a pair of identical, oppositely disposed guide members 30, 32 each of which includes a head 34 and an elongated leg member 36 integral with the head. The guide members 30, 32 are composed of a self lubricating plastic material, preferably of a low cost, low density injection molded plastic such as polyethylene. The head 34 generally extends between a bearing surface 38 at a terminal end and a shoulder 40 spaced from the bearing surface. Each leg member 36 extends from the shoulder 40 in a direction away from the bearing surface 38 and includes a trunk 42 which is immediately adjacent the shoulder 40 and a pair of parallel, spaced apart legs 44 which extend away from the trunk and define a crotch 46 at the interface of the legs and the trunk.

Figure 7:
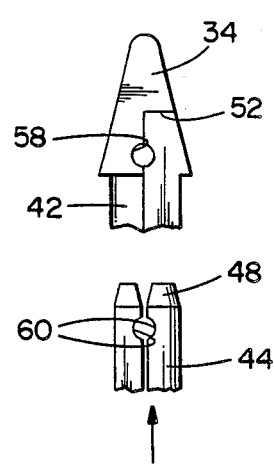
FIGS. 7 and 8 are detail side elevation views illustrating two successive relative positions of component parts of the spring assembly of the invention.
Figure 8:
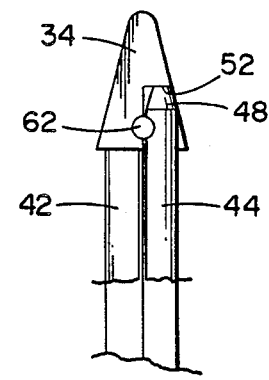
Figure 9:
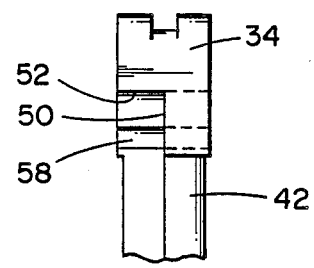
FIG. 9 is a detail front elevation view of one component of the spring assembly.
Figure 5:
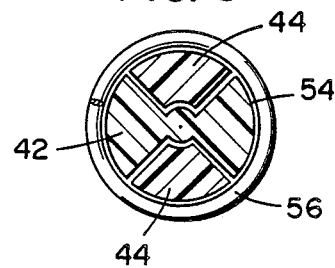
FIG. 5 is a cross section view taken generally along line 5—5 in FIG. 2.
Figure 6:
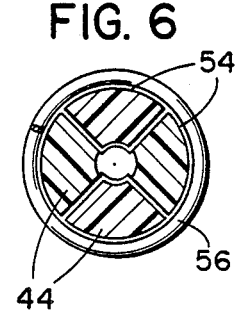
FIG. 6 is a cross section view taken generally along line 6—6 in FIG. 3.

The guide members 30, 32 are mutually, matingly, slidably, engageable (see especially FIGS. 5 and 6) such that, when fully engaged, tip ends 48 at the extremities of the legs 44 are received in an undercut region 50 of the head and able to bear against a recess surface 52 (FIGS. 4, 7, and 8) within that undercut region. The outer surface 54 of the leg member 36 (see FIGS. 5 and 6) in cylindrical and has a substantially constant radius of curvature for its entire length. A compression spring 56 is slidably, engageably, received on the joined guide members, viewing especially FIGS. 2 and 3, so as to overlie the leg members 36 and extend between the shoulders 40. Indeed, the opposed ends of the compression spring 56 engage the facing shoulders 40 of the mating guide members 30, 32. When so assembled, the spring assembly is capable of movement along its longitudinal axis between a retracted condition as seen in FIG. 2 and an expanded condition as seen in FIG. 3. A size relationship between the spring 56 and the leg members 36 is chosen such that when the spring 56 is fully expanded, portions of the legs 44 of one guide member remain in proximity to those of the other guide member. Also, when the guide members are in the retracted condition, the spring itself is under compression.

The inner diameter of the compression spring 56 and the outer diameter of the leg members 36 are preferably about the same size, but the members are sufficiently smaller than the diameter of the spring to enable easy movement of one relative to the other. By reason of this fact and the interdigitated relationship among the legs 44 of the opposed guide members 30, 32, the spring 56 is adequately supported throughout its movement between its retracted and expanded conditions and is prevented from buckling throughout its entire range of axial movement.

Turn now to FIGS. 7-10 which illustrate a key arrangement by reason of which the first and second guide members 30, 32 with the compression spring received thereon between the heads 34 is selectively maintained in the retracted condition. For this purpose, each head member is suitably formed with a transversely extending keyway 58 and each leg 44 is formed with a similar transversely extending, cooperating keyway 60. When the guide members 30, 32 are matingly engaged such that the tip ends 48 bear against the recess surface 52, the keyways 58, 60 are aligned so as to be coaxial with the guide members 30, 32. So positioned, a key member 62 may be inserted into and through the cooperating keyways 60, 62 to thereby prevent any further relative longitudinal movement between the guide members 30 and 32. By reason of the fact that the inner diameter of the spring 56 is substantially similar to the outer diameter of the leg members 36, the keyways 58, 60 are held closely together. Once inserted, the key member 62 is firmly retained within the keyways until its removal is desired. Although the cross sectional shape of the key member 62 and of the keyways 58, 60 is illustrated as being circular, any appropriate configuration such as square or rectangular would also serve the purposes of the invention.

Figure 11:
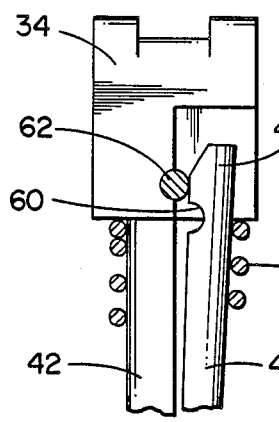
FIG. 11 is a detail front elevation view of the spring assembly illustrating a possible undesirable situation.
Figure 12:
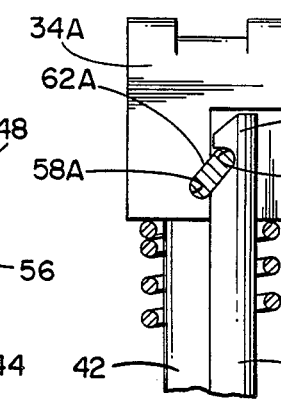
FIGS. 12 and 13 are detail front elevation views, similar to FIG. 11, illustrating another embodiment of the invention for correcting the FIG. 11 situation.
Figure 13:
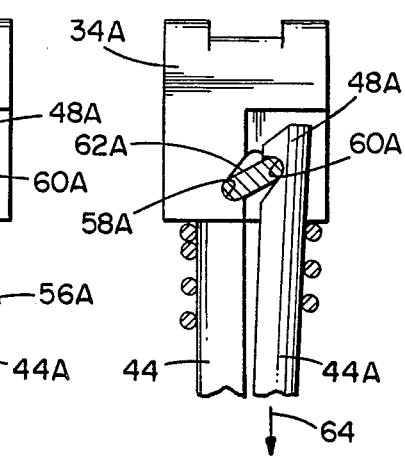

On occasion, the inner diameter of the spring 56 may be larger than the outer diameter of the leg member 36 or does not have substantial hoop strength such that, as illustrated in FIG. 11, the keyway 58 at the tip end 48 of the leg 44 is able to become dislodged from the key 62. When this occurs, the continued bias of the spring 56 may be effective to cause the entire assembly to fly apart. To guard against such an occurrence, a modified construction of the invention is illustrated in FIGS. 12 and 13. In this embodiment, modified keyways 58A, 60A are formed, respectively, in a modified head 34A and in a modified leg 44A. A modified key member 62A is elongated as is the key member 62. However, the key member 62A is of a non round cross section defining opposed major sides and minor sides, it being the minor sides which are respectively engaged with the hooked key ways 58A, 60A. With this construction, FIG. 12 illustrates the situation in which the leg 44A is contiguously positioned with the trunk 42 while in FIG. 13 it has started to move longitudinally in the direction of an arrow 64. With such movement, however, the modified key member 62A merely pivots to a new orientation while still remaining in engagement with the modified keyway 60A. Thus, in this instance, even though the spring 56A is unable to maintain a contiguous relationship between the leg 44A and the trunk 42, the spring assembly continues to be effectively retained in a retracted condition.

Figure 14:
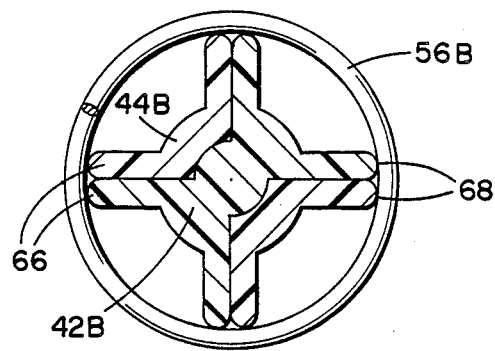
FIG. 14 is a cross section view of another embodiment of the invention.
Figure 15:
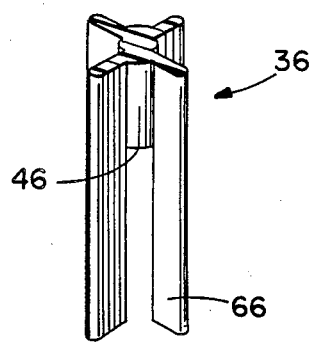
FIG. 15 is a detail perspective view, partially cut away and in section, of the embodiment illustrated in FIG. 14.

There may be instances in which it may be desirable for the diameter of the compression spring to be relatively large. At the same time, it would not be desirable for the leg members 36 to be of a solid construction such that its outer surface has a diameter substantially similar to the inner diameter of the spring. This would result in a spring assembly having a substantially increased mass which may be undesirable. Another embodiment of the invention is illustrated in FIGS. 14 and 15 which serves to accommodate a larger spring without substantially increasing the mass of the spring assembly. In this embodiment, each leg member, which is to say each trunk 42B and each leg 44B, has an associated integral longitudinally extending and generally radially directed fin 66. The fins 66 have terminal edges 68 which lie in a common cylindrical plane and are adapted to slidably, engageably, receive the compression spring (FIG. 14) thereon. In all respects, however, a spring assembly constructed in accordance with FIGS. 14 and 15 operates in the same manner as previously described.

Figure 16:
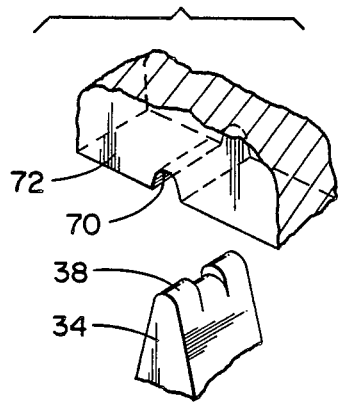
FIGS. 16 and 17 are detail perspective views illustrating two different bearing arrangements utilized by the invention.
Figure 17:
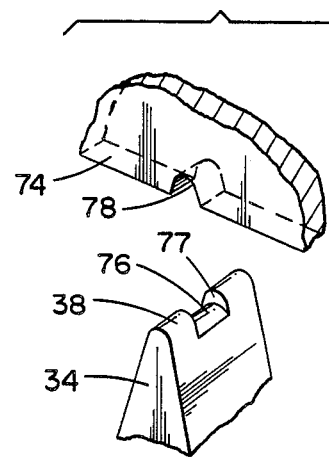

Turn now to FIGS. 16 and 17 for a description of the bearing construction utilized in the installation 22 which enables the spring assembly 20 to operate with optimal efficiency. As previously noted, the spring assembly 20 is positioned between opposed components which are intended to be biased apart. In this instance, the head 34 of the guide member 32 is engaged with a journal bearing 70 suitably formed in an outer wall of a casing 72 which houses the installation 22. In this instance, the bearing 70 has substantially the same width as the bearing surface 38 of the head 34 so that proper engagement is assured. Also, the opposed walls of the journal bearing 70 are flared to enable a wide range of angular movement of the head 34 relative to the casing 72.

At the opposite end of the spring assembly 20, the head 34 of the guide member 30 is journaled on a support plate 74 on which the pulley 28 is rotatably mounted. This construction is more clearly seen in FIG. 17. For this purpose, the bearing surface 38 of each head 34 is formed with a notch 76 which is of a width slightly larger than the thickness of the support plate 74. Opposed lateral surfaces 77 partially define the notch 76. For itself, the support plate 74 is provided with a similar notch 78 which is suitably formed to engageably receive the notch 76. The opposed lateral surfaces prevent lateral movement of the head 34 relative to the support plate 74. Also in the instance of the journal bearing 70, the notch 78 is flared in order to accommodate a range of pivotal motions of the head 34 relative to the support plate 74. Thus, the bearing constructions depicted in FIGS. 16 and 17 enable the range of movements of the spring assembly 20 as depicted in FIG. 1. However, the head 34 is adaptable to a variety of modes of connection between spaced apart mechanical elements, other than by means of the endmost bearing surfaces 38, for example, by means of mating pins and holes.

It is noteworthy that, when faced with the need for "working" springs, product and machine designers generally prefer compression springs over tension springs for reliability, long life, and compactness. It will be appreciated that a compression spring, expanding from a tightly coiled condition, provides a more constant force in a smaller envelope with less opportunity for failure than does a tension spring intended for the same purpose. However, the use of long, thin, compression springs requires special attention and often calls for the use of ancillary components in the form of metal guide rods, retainers, end fittings, bearings, and the like. Additionally, in operation, lubrication is a constant problem, often times resulting in eventual wear, friction losses, noise, and corrosion of the components. The design of the invention presents designers with the best of all worlds, offering a spring assembly which is cost effective and yet operates flawlessly in a continuous manner.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A spring assembly comprising:
   a compression spring having a longitudinal axis and
   first and second oppositely disposed guide members for the captured reception thereon of said compression spring,
   each of said guide members including:
   a head extending between a bearing surface and a shoulder; and
   elongated leg means integral with said head having outer surfaces and extending from said shoulder in a direction away from said bearing surface and terminating at tip ends, said guide members being mutually, matingly slidably, engageable such that, when fully engaged, said tip ends of said first guide member are proximate said head of said second guide member and said tip ends of said second guide member are proximate said head of said first guide member;
   said compression spring being slidably engageably received on said guide members extending between said shoulders and overlying said leg means;
   said first and second guide members with said compression spring received thereon being resiliently movable between a retracted condition whereat said head members are spaced apart by a first distance and an expanded condition whereat said head members are spaced apart by a second distance greater than said first distance, said leg means of said first and second guide members, respectively, preventing its mating said leg means from inward movement toward said longitudinal axis throughout movement of said guide members between said retracted and expanded conditions.

2. A spring assembly as set forth in claim 1 including:
   key means for selectively maintaining said first and second guide members with said compression spring received thereon in the retracted condition.

3. A spring assembly as set forth in claim 1 wherein at least said head of one of said guide members and said leg means of the other of said guide members proximate said tip ends having cooperating transversely extending keyways formed therein for temporarily receiving, when mutually aligned, a mating key member to thereby maintain said spring assembly in the retracted condition with said compression spring in a compressed state and bearing against said oppositely disposed shoulders;

whereby, upon removal of the key member from the keyways, said spring assembly assumes an expanded condition under the bias of said compression spring acting against said shoulders.

4. A spring assembly as set forth in claim 1 wherein said first and said second guide members are identical.

5. A spring assembly as set forth in claim 1 wherein said first and said second guide members are composed of a self lubricating material.

6. A spring assembly as set forth in claim 1 wherein said first and said second guide members are composed of a self lubricating plastic material.

7. A spring assembly as set forth in claim 1 wherein said first and said second guide members are composed of polyethylene.

8. A spring assembly as set forth in claim 1 wherein each of said leg means includes:
a trunk extending away from said bearing surface; and
a pair of parallel, spaced apart legs extending away from said trunk and defining a crotch at the interface of said legs and said trunk.

9. A spring assembly as set forth in claim 8 wherein said head, said trunk, and said pair of legs are all aligned along a longitudinal axis.

10. A spring assembly as set forth in claim 8 wherein said trunk is cylindrical;
wherein said legs have outer cylindrical surfaces which are congruent with said outer cylindrical surface of said trunk; and
wherein said legs of said first guide member are interdigitatably positioned relative to said legs of said second guide member such that said crotch of said first guide member is proximate said crotch of said second guide member.

11. A spring assembly as set forth in claim 10 wherein said trunk and said legs have radially extending fins having terminal edges lying in a common cylindrical plane, said terminal edges adapted to slidably, engageably receive said compression spring thereon.

12. A spring assembly as set forth in claim 3 including:
a key member receivable in said keyways for selectively maintaining said spring assembly in the retracted condition.

13. A spring assembly as set forth in claim 12 wherein each of said keyways includes an opposed cooperating hooked surface respectively on said head and on said leg means; and
wherein said key member is elongated and of non-round cross section defining opposed major sides and minor sides, said minor sides respectively engaged with said hooked surfaces;
whereby said key member is effective to prevent substantial relative longitudinal movement between said first and second guide members notwithstanding relative lateral movement of said first and said second guide members.

14. A spring assembly as set forth in claim 1 wherein said bearing surface includes an elongated arcuate male surface mutually engageable with a component having a similarly shaped female surface.

15. A spring assembly as set forth in claim 1 wherein said head includes a second elongated arcuate male surface depressed from said bearing surface to define opposed lateral surfaces, said second male surface being engageable with a component having a similarly shaped female surface and sufficiently narrow for reception between said lateral surfaces.

16. A method of installing a compression spring assembly between first and second components intended to be biased apart comprising the steps of:
assembling a compression spring onto elongated leg means of oppositely disposed first and second guide members intermediate opposed head members thereof;
selectively maintaining the assembly including the compression spring and the guide members in a retracted condition by means of a key member which matingly engages cooperating keyways formed in the first and second guide members;
inserting the retracted spring assembly between the first and second components;
guiding the head member of the first guide member into mating engagement with the first component;
withdrawing the key member from the keyway of the first and second guide members;
allowing the assembly to assume an expanded condition under the bias of the compression spring; and
guiding the head member of the second guide member into mating engagement with the second component.

17. A method as set forth in claim 13 wherein the last two steps are performed simultaneously.

18. A guide assembly for a spring movable between extended and retracted positions comprising:
leg means for slidably receiving the spring thereon;
head means connected to said leg means for engagement with opposed ends of the spring; and
keying means including keyway means on either said head means or on said leg means for selectively maintaining the spring in the retracted position.

19. The guide member as set forth in claim 18 wherein said head means and said leg means both have a keyway means thereon.

20. The guide member as set forth in claim 18 wherein said leg means has a pair of substantially parallel, spaced apart legs.

21. The guide member as set forth in claim 20 wherein said legs have outer cylindrical surfaces.

22. A guide assembly for use while installing a spring or similar article comprising:
first and second guide members each with head means connected to leg means, said leg means of said first guide member shaped for assembly together with said leg means of said second guide member by sliding one leg means relative to the other into partially overlapping positions, at least said head means of one said guide member and said leg means of said other guide member having keyway means; and key means engaged with said keyway means on said first and second guide members to hold said first and second members in a fixed position relative to one another.

23. The guide assembly a set forth in claim 22 wherein said leg means of each of said guide members includes a pair of parallel, spaced apart legs and said leg means of said first guide member is interdigitally positioned relative to said leg means of said second leg means.

24. A guide assembly kit for use in installing a spring or similar article comprising:
first and second guide members each with head means connected to leg means, said leg means of said first guide member shaped for assembly together with said leg means of said second guide member by sliding one leg means relative to the other into partially overlapping positions, at least said head means of one said guide member and said leg means of said other guide member having keyway means; and
key means which can be engaged with said keyway means in said first and second guide members when said guide members are assembled together and said keyway means are aligned.

25. The guide assembly kit as set forth in claim wherein said first and second guide members each have keyway means in their head means and leg means.

26. The guide assembly kit as set forth in claim 24 further including a spring of such size and shape to be installed by said guide assembly.

27. A guide assembly comprising:
spring means movable between compressed and relaxed conditions and having a hollow internal region;
first and second guide members each having a portion that slides into said hollow region; and
fastening means for fixedly positioning said first and second guide members relative to one another when said guide members have been slid into said hollow region whereby said spring means is retained in the compressed condition and said guide members are retained in an assembled state for installation.

28. A guide assembly as set forth in claim 27 wherein each said guide member has a leg portion which slides into said spring and a head portion, said leg portion and said head portion having keyway means, and said fastening means including a key means which is located in said keyway means.

* * * * *